(12) United States Patent
Hack et al.

(10) Patent No.: US 10,276,970 B2
(45) Date of Patent: Apr. 30, 2019

(54) CORD AND PLUG COVER WITH ONE OR MORE POCKETS AND/OR SUPPORT SURFACES

(71) Applicant: GR Innovations LLC, Waterford, MI (US)

(72) Inventors: Gregory D. Hack, Waterford, MI (US); Rebecca A. Hack, Waterford, MI (US)

(73) Assignee: GR Innovations LLC, Hadley, MI (US)

( * ) Notice: Subject to any disclaimer, the term of this patent is extended or adjusted under 35 U.S.C. 154(b) by 0 days.

(21) Appl. No.: 15/795,656

(22) Filed: Oct. 27, 2017

(65) Prior Publication Data

US 2018/0123282 A1    May 3, 2018

Related U.S. Application Data

(60) Provisional application No. 62/415,090, filed on Oct. 31, 2016.

(51) Int. Cl.
| | |
|---|---|
| *H01R 13/62* | (2006.01) |
| *H01R 13/52* | (2006.01) |
| *H02G 3/08* | (2006.01) |
| *H02G 9/02* | (2006.01) |
| *H01R 24/28* | (2011.01) |
| *H01R 24/20* | (2011.01) |

(52) U.S. Cl.
CPC ......... *H01R 13/5213* (2013.01); *H02G 3/088* (2013.01); *H02G 9/025* (2013.01); *H01R 24/20* (2013.01); *H01R 24/28* (2013.01)

(58) Field of Classification Search
CPC .............. H01R 13/6392; H01R 13/516; H01R 13/518; H01R 13/5213
USPC ......................................... 439/367–369, 458
See application file for complete search history.

(56) References Cited

U.S. PATENT DOCUMENTS

| | | | | |
|---|---|---|---|---|
| 3,147,338 A | * | 9/1964 | Ekvall ...................... | H01R 4/38 174/138 F |
| 3,293,588 A | * | 12/1966 | Blonder ............. | H01R 13/6397 174/66 |
| 4,183,603 A | * | 1/1980 | Donarummo ...... | H01R 13/6392 439/369 |
| 4,381,063 A | * | 4/1983 | Leong .................... | H02B 1/066 174/67 |
| 4,382,649 A | * | 5/1983 | Meyer .................. | H01R 13/518 174/60 |
| 4,488,764 A | * | 12/1984 | Pfenning ............ | H01R 13/6397 439/133 |
| 4,702,541 A | | 10/1987 | Arnold | |
| 4,773,874 A | * | 9/1988 | Kopeski, Jr. ....... | H01R 13/6392 439/369 |

(Continued)

*Primary Examiner* — Hae Moon Hyeon
(74) *Attorney, Agent, or Firm* — Fishman Stewart PLLC (57) ABSTRACT

A cover suitable for covering a portion of one or more extension cords is disclosed. A cord plug cover includes a plurality of sides that provide a generally covered area. In embodiments, one or more of the plurality of sides include one or more slots and one or more support surfaces. In embodiments, the support surfaces is configured to receive or support one or more extension cords that extend through the cover and the covered area. Embodiments of a cord plug cover include one or more of the following: one or more rib elements, one or more relief portions, one or more pockets, and/or one or more securing formations.

17 Claims, 5 Drawing Sheets

(56) References Cited

U.S. PATENT DOCUMENTS

| | | | |
|---|---|---|---|
| 5,421,457 A * | 6/1995 | Listenberger | B65D 85/04 |
| | | | 174/50 |
| 6,250,946 B1 | 6/2001 | Tardy | |
| 6,329,597 B1 * | 12/2001 | Kaloustian | A47B 21/06 |
| | | | 174/67 |
| 6,551,135 B2 * | 4/2003 | Stekelenburg | H01R 13/5213 |
| | | | 439/367 |
| 7,285,725 B1 | 10/2007 | Saman | |
| 7,317,162 B2 | 1/2008 | Kaady | |
| 7,544,082 B1 * | 6/2009 | Halvorsen | H01R 13/5213 |
| | | | 174/135 |
| 8,535,082 B2 * | 9/2013 | Lifson | H01R 13/6392 |
| | | | 439/369 |
| 2006/0128210 A1 * | 6/2006 | Peters | H01R 13/52 |
| | | | 439/521 |

* cited by examiner

CORD AND PLUG COVER WITH ONE OR MORE POCKETS AND/OR SUPPORT SURFACES

CROSS-REFERENCE TO RELATED APPLICATION

This application claims the benefit of U.S. Provisional Patent Application Ser. No. 62/415,090, filed on Oct. 31, 2016, the disclosure of which is hereby incorporated herein by reference in its entirety.

TECHNICAL FIELD

The present disclosure relates to covers for cords and/or plugs, including methods and systems pertaining to extension cord plug covers.

BACKGROUND

Extension cords (e.g., electrical extension cords) may be used in a variety of locations, including, but not limited to, outdoors. For example, extension cords may be used to provide electrical power to camp sites, recreational vehicles, outdoor holiday light displays, and for various other purposes. As a result, extension cords may be exposed to the elements (e.g., rain, snow, and/or wind). While some extension cords may be configured to resist these elements, the connection of one extension cord to another may have more vulnerability. Some extension cords may provide a connector end that is not designed to be water-resistant or watertight, and consequently, water may unintentionally enter or affect the connection.

For example, two extension cords may be connected in an outdoor situation to provide power to a camp site or an outdoor holiday lights. The connection of the two extension cords may be resting on the ground, which may encounter water or precipitation from various sources—e.g., weather, sprinklers, etc. Additionally, people, pets, and/or vehicles may encounter the connection and may step on or run over the connection, which could lead to damaging the cord and/or increased risk of exposure or electrical hazards (e.g. shock). It is desirable for an extension cord plug cover or system that addresses some or all of the foregoing challenges.

SUMMARY

A cover suitable for covering a portion of one or more extension cords is disclosed. A cord plug cover includes a plurality of sides that may define or provide a generally covered area. In embodiments, one or more slots may be disposed on or in connection with one or more sides. In embodiments one or more pockets and/or support surfaces may be in communication with the one or more slots, and portions thereof may be configured to receive or support one or more extension cords, which may extend through the cover and the covered area thereof. Embodiments of a cord plug cover may include one or more rib elements, one or more relief portions, and/or one or more securing formations.

DETAILED DESCRIPTION

Figure 1:
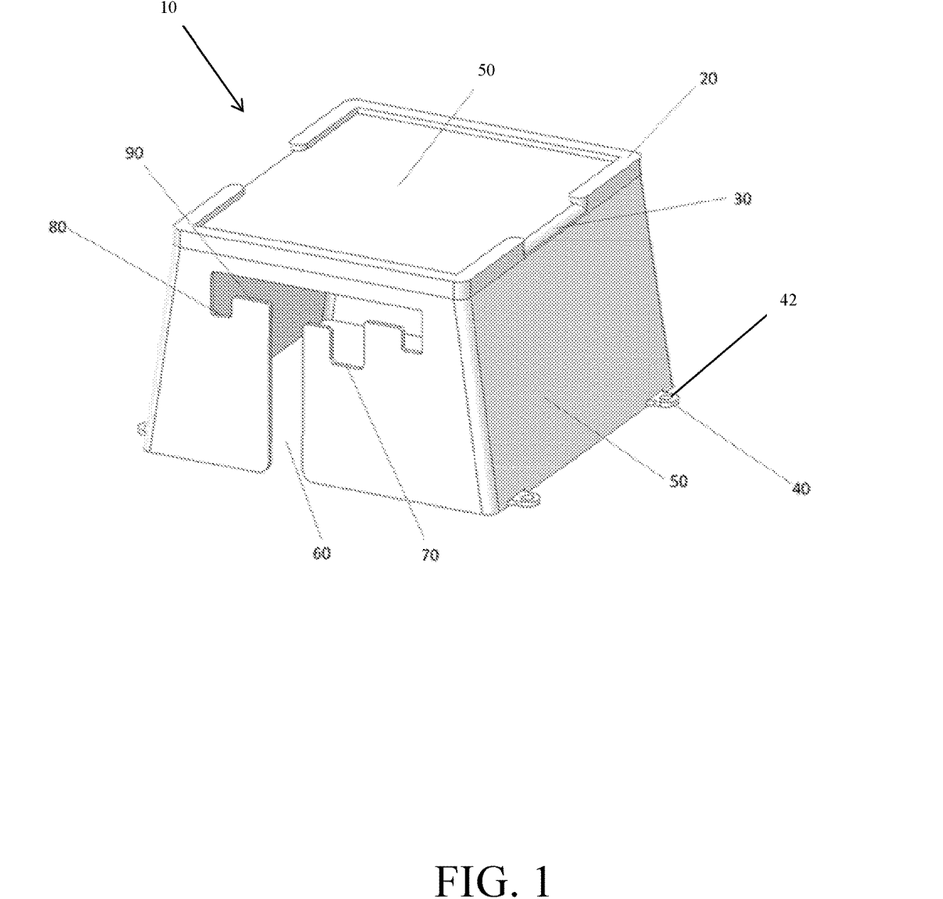
FIG. 1 is an isometric view generally illustrating an embodiment of an extension cord plug cover, in accordance with aspects or teachings of the present disclosure.

Referring now to the drawings, FIG. 1 generally illustrates a non-limiting embodiment of an extension cord plug cover ("plug cover") 10. As generally illustrated, an embodiment of a cover 10 may, for example, include one or more rib elements 20, one or more relief portions 30, one or more securing formations or tabs 40, one or more sides 50, one or more slots 60, one or more pockets (e.g., 70 or 80), and one or more support surfaces (e.g. 90). Plug cover 10 may be formed (e.g., molded) of a polymer (e.g., polypropylene and/or high density polyethylene). However, the plug cover may be comprised of various other materials, as known to those of skill in the art, including, without limitation, metals or rubber. By way of example and without limitation, embodiments of a plug cover may be injection molded, compression molded, and/or vacuum formed. In embodiments, the plug cover may be provided in one or more colors to promote visibility. For example and without limitation, all or portions of a plug cover may have one or more of the following colors: black, orange, red, white, yellow, blue, green, brown, and purple.

In embodiments, a rib element 20 may be included (e.g., molded) in connection with one or more sides 50 of a plug cover. For example and without limitation, a rib element 20 may be included on a top and/or upward facing side 50 of a plug cover 10. Rib element 20 may be configured to provide added strength or structural integrity, and/or to help prevent water and/or other undesired material (e.g., dirt) from passing over rib element 20. In embodiments, a rib element 20 may direct (e.g., guide or permit flow of) water and/or other undesired material toward one or more relief portions 30, for example, on at least one side 50 of plug cover 10. For example and without limitation, with some embodiments a rib element 20 may extend upwardly just slightly above the surface of a top surface of the cover along an edge or rim of the top surface. For example and without limitation, in embodiments, the rib element may extend upwardly less than 10 mm, less than 5 mm, or less than 2 mm.

In embodiments, one or more relief portions 30 may be configured (e.g., molded) on one or more sides 50 of a plug cover 10. For example, relief portion 30 may be configured on a top and/or horizontal-facing (e.g., upward) side 50 of plug cover 10. Relief portion 30 may be configured (e.g., situated) adjacent to one or more rib elements 20 of a plug cover 10 or may comprise a reduced portion of a rib element. In embodiments, one or more relief portions 30 may be configured between two rib elements 20 of a plug cover 10. Relief portion 30 may be configured to permit (e.g., allow) water and/or other undesired material (e.g., dirt) to flow through (e.g., over) and/or off of (e.g., exit) one or more sides 50 of a plug cover 10. Relief portion 30 may be include attributes (e.g., elements) that may promote the flow of water and/or other undesired material over one or more surfaces of relief portion 30, such as but not limited to a spout, a funnel, and/or a low-friction (e.g., smooth) surface. Further, in embodiments, relief portion 30 may include a substantially curved edge (e.g., between a top surface and a side wall) to promote the flow of materials over one or more surfaces.

In embodiments, one or more securing formations (e.g., securing tabs 40) may be configured (e.g., molded) on one or more sides 50 of a plug cover 10. For example, securing tab 40 may be configured on a vertically-oriented (e.g., upright) side 50 of plug cover 10. Securing tab 40 may be configured adjacent to one or more edges of one or more sides 50 of plug cover 10. Securing tab 40 may be configured to permit (e.g., allow) a fastener (e.g., stake, nail, screw) to be inserted through an aperture (e.g., hole) 42 of securing tab 40 into another surface, such as, but not limited to, the ground (e.g., earth) and/or a mounting surface. Securing tab 40 may be configured astride (e.g., spanning) one or more sides 50 of plug cover 10. For example, securing tab 40 may be configured at the intersection (e.g., corner) of two or more sides 50 of a plug cover 10.

A plug cover 10 may comprise a plurality of sides 50. In embodiments, one or more sides 50 may be formed (e.g., molded) in combination to form a plug cover 10. One or more sides 50 of plug cover 10 may be configured to enclose a surface area (which may comprise a volume (e.g., a three-dimensional space)). For example and without limitation, a plug cover 10 may be configured with one side 50, in the form of, for example, a hemi-sphere (e.g., dome). In embodiments, one or more sides 50 may be configured in plug cover 10, such as, but not limited to a truncated cone, a square, a rectangle, a hexagon, or any other multi-sided geometric and/or polygonal shape. One or more sides 50 of plug cover 10 may be configured to enclose a volume. One or more sides 50 of plug cover 10 may include one or more rib elements 20, one or more relief portions 30, and/or one or more securing formations (e.g., tabs 40). One or more sides 50 of plug cover 10 may extend upwards to a vertical height that is, for example and without limitation, at least 10 cm and less than 20 cm. In an embodiment, the vertical height of the plug cover may be about 16 cm±2 cm.

In embodiments, one or more sides 50 of a plug cover 10 may include one or more pockets (e.g., 70 or 80) and one or more support surfaces (e.g. 90), such as disclosed further below. For example and without limitation, one or more sides 50 may be opposite one another and may include a combination of pockets (e.g. 70 or 80) and/or support surfaces (e.g. 90) in which opposite sides may be reverse or mirror images of one another. In embodiments, one or more sides 50 of plug cover 10 may be configured with information or attributes (e.g., elements) such as, without limitation, warnings, instructions, and/or other information pertaining to the use and/or operation of plug cover 10.

In embodiments, one or more sides 50 of a plug cover 10 may be configured to selectively connect with or seal one or more other sides of plug cover 10. For example, one side may be configured as a bottom side 50 (e.g., beneath the other one or more sides 50), which may be configured as a selectively attachable floor and/or tray (e.g., attached after a connection of cords is made within a plug cover). If included, a bottom side may include a seal (e.g., gasket) and/or other joining structure (e.g., magnets, hook-and-loop fasteners) to selectively connect to one or more other sides 50 of plug cover 10. Additionally and alternatively, bottom side 50 may be configured to be secured to the one or more other sides 50 via one or more securing tabs 40. In embodiments, bottom side 50 may include one or more securing tabs 40 that may align (e.g., mate) with one or more corresponding securing tabs 40 on the other one or more sides 50. A fastener (e.g., stake, screw) may pass through the one or more securing tabs 40 of bottom side 50 and/or the other one or more sides 50 and may join (e.g., connect) bottom side 50 with the other one or more sides 50 of plug cover 10.

In embodiments, one or more slots 60 may be configured (e.g., molded) into one or more sides 50 of a plug cover 10. For example, one or more slots 60 may be configured on one or more vertically-oriented (e.g., upright) sides 50 of plug cover 10. As generally illustrated, slots, which may be similar, may be provided on opposing sides of a plug cover 10. Slots 60 may extend through a side from a bottom edge of a side 50 (e.g., such that the slot may be said to be "open" with respect to the side 50) and upwardly some vertical distance. Slots 60 may be configured to permit a cord portion of one or more extension cords 140 (e.g., see FIGS. 2-3, 5) to pass therethrough. By way of example, and without limitation, embodiments of plug covers provided in accordance with the present disclosure may accommodate 30 amp, 50 amp, or other higher-amp extension cords. Additionally and alternatively, slots 60 may be configured to deformably engage one or more extension cords 140 via the flexibility (e.g., warpage, bending) of the material of one or more sides 50. In embodiments, one or more slots 60 may be configured (e.g., in communication) with one or more pockets (e.g., 70 or 80) and/or one or more support surfaces (e.g. 90) of plug cover 10. In embodiments, the slots may generally extend in a vertical direction, and pockets and/or support surfaces may extend from a slot, for example, in one or both horizontal directions relative to the slot. For example, a portion of one or more slots 60 may be connected with and/or be adjacent to one or more pockets (e.g., 70 or 80) and one or more support surfaces (e.g. 90). One or more extension cords 140 may be inserted into one or more slots 60 and/or transition (e.g., move) into one or more pockets or one or more support surfaces. In embodiments, one or more slots 60 may be configured to extend from a bottom edge of one or more sides 50 of plug cover 10 such that one or more extension cords 140 may be positioned (e.g., supported) by one or more pockets (e.g., 70 or 80) or one or more support surfaces (e.g. 90) (e.g., see FIGS. 2-3, 5). In embodiments, one or more slots 60 may be configured in proximity to one or more rib elements 20 such that one or more rib elements 20 may prevent water and/or other undesired material from entering plug cover 10 via slots 60 and/or one or more pockets or one or more support surfaces.

In embodiments, a first slot 60 may be configured on a first side 50 of plug cover 10. A second slot 60 may be configured on a second side 50 opposing the first side 50. For example and without limitation, a plug cover 10 with equal sides 50 (e.g., a square) may have a first slot 60 on a first side 50, and directly opposite first side 50 is a second side 50 with a second slot 60. Additionally and alternatively, a plug cover 10 with equal sides 50 (e.g., a square) may have a first slot 60 on a first side 50, and adjacent to first side 50 may be a second side 50 with a second slot 60.

In embodiments, some or all of sides 50 of a plug cover 10 may include one or more slots 60. For example, plug cover 10 configured as an octagon may include one or more slots 60 on one or more sides 50. Slots 60 may be configured on alternating sides 50 of an octagonally-shaped plug cover 10. In embodiments, a plug cover 10 with one side 50 (e.g., a hemi-sphere) may include one or more slots spaced at predetermined or random intervals, or a combination thereof.

In embodiments, one or more pockets (e.g., 70, 80) and one or more support surfaces (e.g. 90) may be configured in one or more sides 50 of a plug cover 10. For example, one or more pockets (e.g., 70, 80) and/or one or more support surfaces (e.g., 90) may be configured to support a portion of one or more extension cords (e.g., cords 140). In embodiments, one or more pockets (e.g., 70 or 80) and one or more support surfaces (e.g. 90) may be configured to be adjacent to and/or have access to (i.e., be in communication with) one or more slots 60. One or more extension cords 140 may be inserted into one or more slots 60 and/or transition into one or more pockets (e.g., 70 or 80) and one or more support surfaces (e.g. 90). One or more pockets or support surfaces may be configured in one or more sides 50 distant (e.g., opposite) from one or more edges of sides 50 that may be in close proximity to the ground and/or other mounting surface. In embodiments, one or more pockets (e.g., 70 or 80) and one or more support surfaces (e.g. 90) may support one or more extension cords 140 and/or extension cord plug connections 150 such that extension cords 140 and/or plug connections 150 may be suspended above (e.g., not touching) the ground and/or another mounting surface of plug cover 10 (e.g., see FIGS. 2-3, 5).

Figure 2:
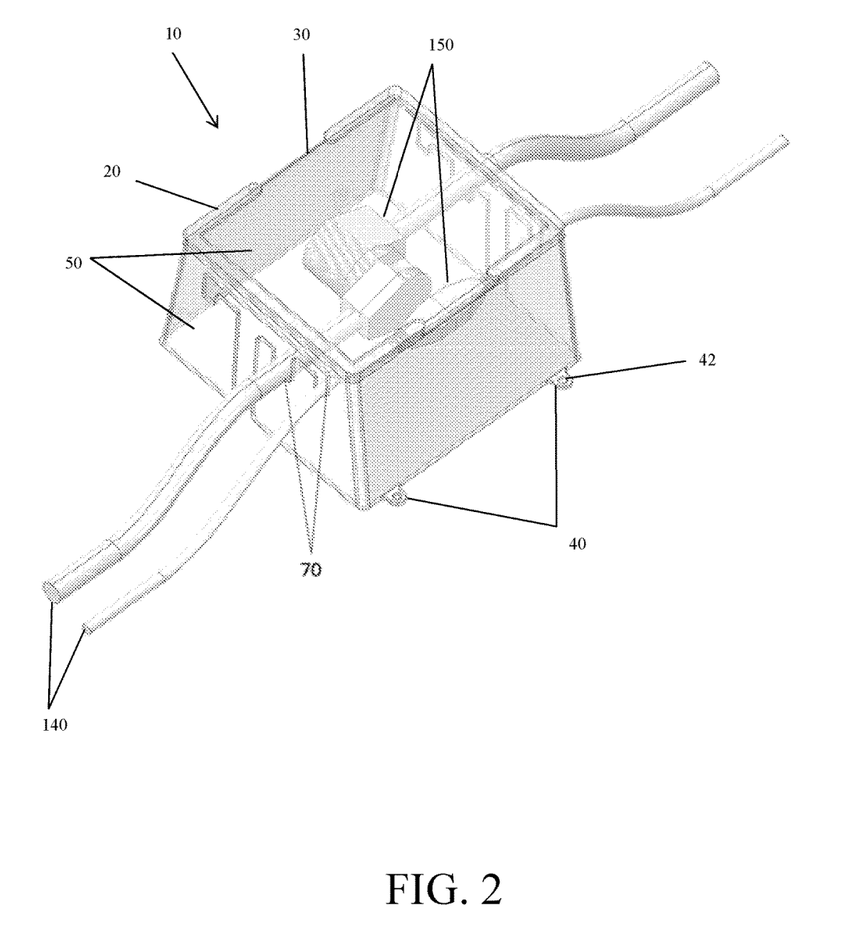
FIG. 2 is an isometric view, with a clear top panel included for illustration purposes, which generally illustrates an embodiment of an extension cord plug cover with connected extension cords.
Figure 3:
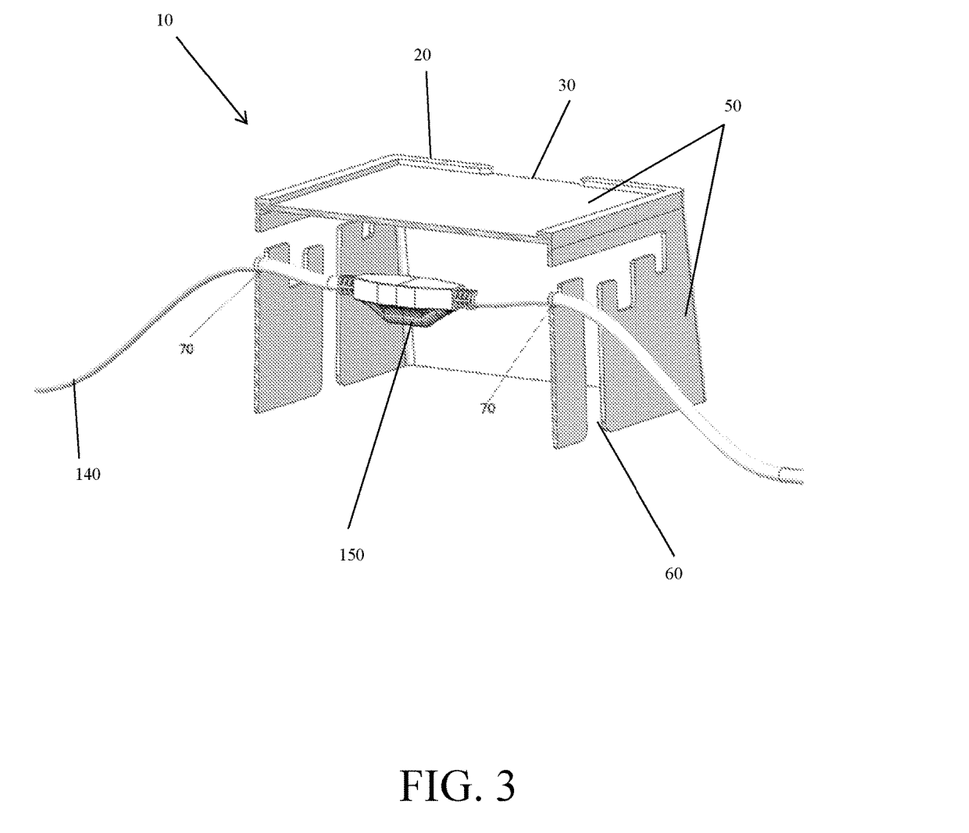
FIG. 3 is a sectional view generally illustrating an embodiment of an extension cord plug cover with connected extension cords.

FIGS. 2-3 generally illustrate an embodiment of an extension cord plug cover 10. In embodiments, one or more sides 50 of a plug cover 10 may be formed (e.g., molded) of a polymer (e.g., polypropylene and/or high density polyethylene). In embodiments, at least one side 50 may be configured with one or more rib elements 20 and/or relief portions 30. In embodiments, one or more sides 50 may be configured with one or more securing tabs 40. In embodiments, one or more securing tabs 40 may be configured in proximity to one or more edges of one or more sides 50. In embodiments, one or more sides 50 may be configured with one or more slots 60 that may be in communication with one or more pockets (e.g., 70 or 80) and/or one or more support surfaces (e.g. 90). One or more slots 60, and/or one or more pockets or one or more support surfaces, may engage one or more extension cords 140 and/or may support one or more extension cords 140 such that one or more extension cords 140 may be suspended above the ground, a mounting surface, and/or a bottom-facing side 50.

Figure 4:
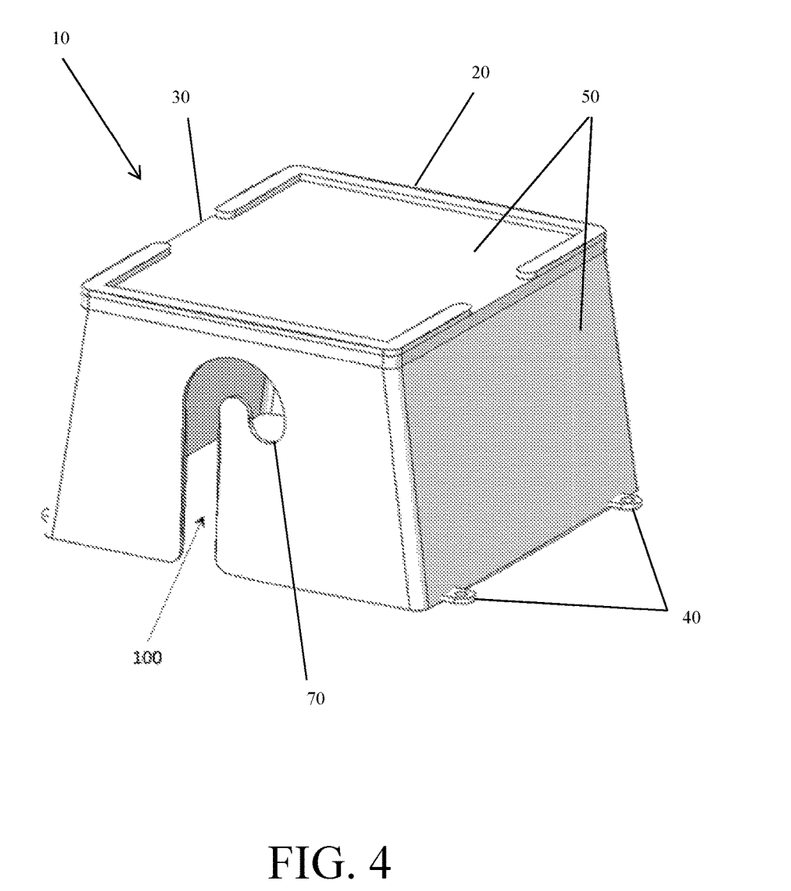
FIG. 4 is an isometric view generally illustrating another embodiment of an extension cord plug cover, in accordance with aspects or teachings of the present disclosure.

FIG. 4 generally illustrates an embodiment of an extension cord plug cover 10. In embodiments, one or more sides 50 of a plug cover 10 may be formed (e.g., molded) of a polymer (e.g., polypropylene and/or high density polyethylene). In embodiments, at least one side 50 may be configured with one or more rib elements 20 and/or relief portions 30. In embodiments, one or more sides 50 may be configured with one or more securing tabs 40. In embodiments, one or more securing tabs 40 may be configured in proximity to one or more edges of one or more sides 50. In embodiments, one or more sides 50 may be configured with one or more slots 100 that may be in communication with one or more pockets (e.g., 70 or 80) and/or one or more support surfaces (e.g. 90). One or more slots 100 may be configured to include one or more pockets (e.g., 70 or 80) and/or one or more support surfaces (e.g. 90). In embodiments, one slot 100 may be configured with one pocket 70. One or more slots 100, one or more pockets (e.g., 70 or 80) and/or one or more support surfaces (e.g. 90) may engage one or more extension cords 140 and/or may support one or more extension cords 140 such that one or more extension cords 140 may avoid contact with the ground, a mounting surface, and/or a bottom-facing side 50.

Figure 5:
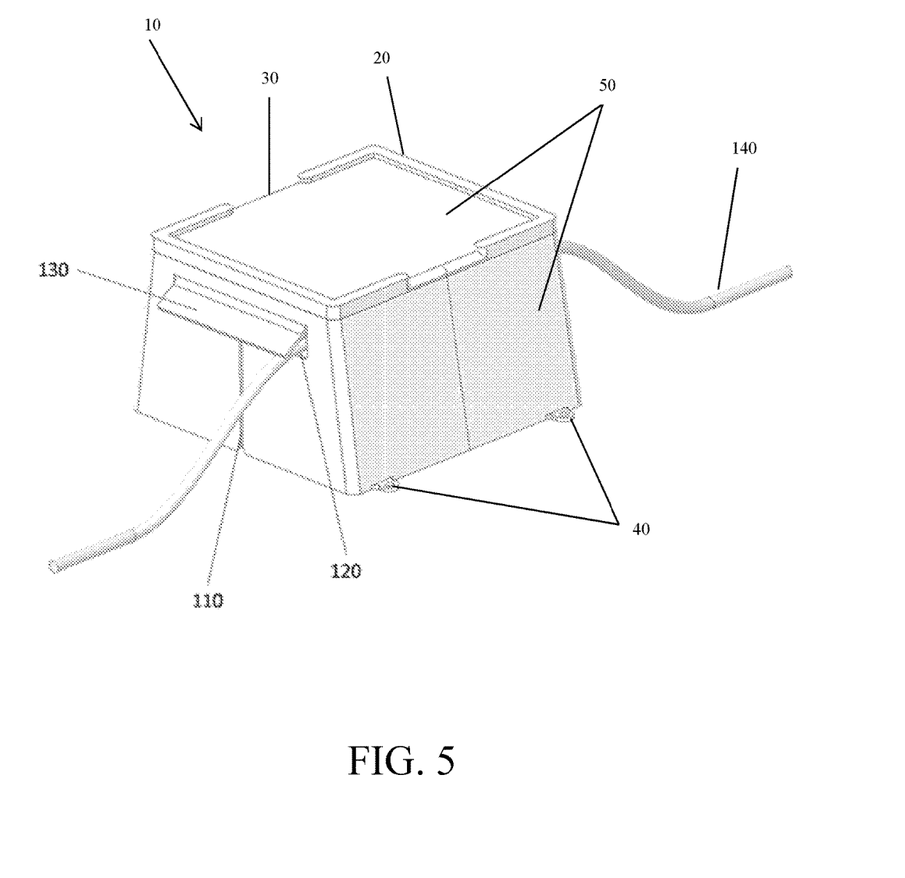
FIG. 5 is an isometric view generally illustrating another embodiment of an extension cord plug cover, in accordance with aspects or teachings of the present disclosure.

FIG. 5 generally illustrates an embodiment of an extension cord plug cover 10. In embodiments, one or more sides 50 of a plug cover 10 may be formed (e.g., molded) of a polymer (e.g., polypropylene and/or high density polyethylene). In embodiments, at least one side 50 may be configured with one or more rib elements 20 and/or relief portions 30. In embodiments, one or more sides 50 may be configured with one or more securing tabs 40. In embodiments, one or more securing tabs 40 may be configured in proximity to one or more edges of one or more sides 50. In embodiments, one or more sides 50 may be configured with one or more slots 110 that may be in communication with one or more pockets 120. One or more slots 110 may be configured to include one or more pockets 120. In embodiments, one slot 110 may be configured with one pocket 120. In embodiments, one slot 110 may be configured such that the edges of slot 110 may be in close proximity to each other (touching or nearly touching). In embodiments, a flap—which may comprise a flexible flap 130—may be configured as part of one or more sides 50 of a plug cover 10. The flap may comprise a separate component that may be connected or affixed to a side of the plug cover via various techniques that would be known to those in the field. In embodiments, a flap may be comprised of plastic, rubber, or various other materials, or combinations thereof. In embodiments, a flexible flap 130 may be configured to cover or protect at least a portion of a side of the plug cover 10 and may help to prevent water and/or other undesirable material from entering the covered portion of the plug cover 10. One or more slots 110 and/or one or more pockets 120 may engage one or more extension cords 140 and/or may support one or more extension cords 140 such that one or more extension cords 140 may avoid contact with the ground, a mounting surface, and/or a bottom-facing side 50.

Various embodiments are described herein to various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "embodiments," "one embodiment," or "an embodiment," or the like, means that a particular feature, structure, or characteristic described in connection with the embodiment is included in at least one embodiment. Thus, appearances of the phrases "in various embodiments," "in embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It should be understood that references to a single element are not so limited and may include one or more of such element. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." throughout the specification is to be construed broadly and is used to provide non-limiting examples of embodiments of the disclosure, and the disclosure is not limited to such examples. It is intended that all matter contained in the above description or shown in the accompanying drawings shall be interpreted as illustrative only and not limiting. Changes in detail or structure may be made without departing from the present disclosure.

Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. A cover suitable for covering a portion of one or more extension cords, the cover comprising:
   a plurality of sides, the plurality of sides configured to provide a covered area;
   wherein a first side of the plurality of sides includes a first slot; and the first side includes one or more pockets connected to the first slot and configured to receive or support one or more portions of one or more extension cords such that said one or more portions of said one or more extension cords is suspended above a mounting surface;
   wherein a second side of the plurality of sides includes a second slot configured to receive a second portion of a second extension cord; and the second side is disposed opposite the first side;
   wherein the plurality of sides includes a top side, a third side, and a fourth side; the top side includes a first rib element and a second rib element the first rib element extends along the first side, the third side, and the fourth side; and the second rib element extends along the second side, the third side, and the fourth side; and
   wherein the top side includes a first relief portion along the third side; and the top side includes a second relief portion along the fourth side; and the first relief portion and the second relief portion are configured to facilitate flow of material off of the top side.

2. The cover of claim 1, wherein the first slot extends from a bottom edge of the first side upwardly a vertical distance; and the second slot extends from a bottom edge of the second side upwardly a second vertical distance.

3. The cover of claim 2, wherein the first side and the second side are substantially vertical.

4. The cover of claim 1, wherein at least one of the one or more pockets has a different vertical position than another one of the one or more pockets.

5. The cover of claim 1, wherein the one or more pockets includes a first pocket and a second pocket, and wherein the first pocket is disposed on a first side of the first slot, and the second pocket is disposed on a second side of the first slot.

6. The cover of claim 1, wherein a first pocket of the one or more pockets of the first side is configured to support a first portion of a first extension cord of said one or more portions of said one or more extension cords; the first portion is configured for connection with said second portion of said second extension cord via a plug connection; the first pocket and a pocket of the second side are configured to support the first portion and the second portion such that the plug connection is suspended above said mounting surface; and the pocket of the second side is in communication with the second slot.

7. The cover of claim 1, wherein at least one of the plurality of sides includes a top side, and the top side includes a plurality of rib elements and a plurality of relief portions.

8. The cover of claim 1, wherein the cover includes at least one securing formation or tab extending from a third side of the plurality of sides.

9. The cover of claim 8, wherein the at least one securing formation or tab extends outwardly in a direction substantially parallel to a top side of the cover.

10. The cover of claim 8, wherein the plurality of sides are substantially planar.

11. The cover of claim 1, wherein the first side and the second side are substantially vertical; the plurality of sides includes a top side; the plurality of sides includes a third side that is tapered from a bottom edge of the third side to the top side; and the plurality of sides includes a fourth side that is tapered from a bottom edge of the fourth side to the top side.

12. A cover suitable for covering a portion of one or more extension cords, the cover comprising:
   a plurality of sides including a top side, the plurality of sides configured to define a covered area,
   one or more slots disposed on one or more of the plurality of sides, the one or more slots including at least a portion that extends in a vertical direction from a bottom of the cover toward the top side; and
   one or more pockets in communication with the one or more slots, the one or more pockets configured to receive or support a portion of one or more extension cords above a mounting surface;
   wherein the plurality of sides includes a first side, a second side, a third side, and a fourth side; the top side includes a first rib element, a second rib element, a first relief portion, and a second relief portion; the first rib element extends vertically upward from the top side and extends along the first side, the third side, and the fourth side; the second rib element extends vertically upward from the top side and extends along the second side, the third side, and the fourth side; the first relief portion is disposed along the third side; the second relief portion is disposed along the fourth side; and the first relief portion and the second relief portion are configured to facilitate movement of material off of the top side.

13. The cover of claim 12, wherein a first slot of the one or more slots is provided in the first side, and a second slot of the one or more slots is provided in the second side; and the first side generally opposes the second side.

14. The cover of claim 13, wherein the top side, the third side, and the fourth side are substantially rectangular, the first side and the second side are substantially trapezoidal; and the cover includes an open bottom.

15. The cover of claim 12, wherein the top side is substantially horizontal; the first side and the second side are disposed substantially perpendicular to the top side; and the third side and the fourth side are tapered.

16. The cover of claim 12, wherein the first relief portion is disposed opposite the second relief portion.

17. The cover of claim 16, wherein the first relief portion and the second relief portion are provided between the first and second rib elements.

* * * * *